INVENTOR
EARNEST PAUL MATTHEWS
BY Frank A. Steinhilper
ATTORNEY

INVENTOR
EARNEST PAUL MATTHEWS

BY Frank A. Steinhilper

ATTORNEY

United States Patent Office 2,878,972 Patented Mar. 24, 1959

2,878,972

ROUGH SURFACE POWDER CLOUD GENERATION

Earnest Paul Matthews, Alliance, Ohio, assignor, by mesne assignments, to Haloid Xerox Inc., a corporation of New York Application February 18, 1955, Serial No. 489,210

6 Claims. (Cl. 222—193)

This invention relates in general to xerography and in particular to development of electrostatic charge patterns.

In xerography an image pattern of electric charges is formed on a xerographic plate by exposing a sensitive plate to a light image or light pattern. A surface of the plate is composed of a photosensitive material that reacts to light by changing its electrical resistance characteristics. The plate is made sensitive by placing on this surface, which is electrically insulating in darkness, a uniform electrostatic charge. The sensitive plate, when exposed to a light pattern, dissipates charges where light strikes the plate. Dissipation of charge results due to an increase in conductivity or a decrease in the insulating characteristics of areas of the plate struck by light. Insulating characteristics of the plate are not affected where areas of blackness or no light reach the plate surface, and these areas continue to hold electrostatic charges. Exposing then, to a light pattern, results in substantially complete discharge in areas where light strikes, but no discharge where no light strikes. Areas projected to the surface of a sensitive xerographic plate which are between the extremes of no light and intense or full light result in proportional reductions of electrostatic charge on the photosensitive surface of the plate. The resultant pattern of electric charges following exposure of the sensitive plate to a projected light image is one where substantially no charges exist where full light was projected to the surface, original charges continue to exist where no light reached the surface, and charges in direct proportion to the lack of light exist where amounts of light between the extremes of no light and intense light were projected to the surface of the plate. This electric charge pattern, which is generally termed in xerography an electrostatic image, may be transferred to another surface or allowed to remain on the plate and may then be developed by bringing into its areas of influence electrostatically charged powder particles. Development is the deposition of powder particles on a surface carrying an electric charge pattern in image configuration which is controlled and attained through the electrostatic charge pattern on the surface.

It is an object of this invention to improve upon means and methods for the development of electrostatic images.

It is also an object of this invention to improve upon apparatus for the development of electrostatic images.

Generally in powder cloud creating apparatus, there is included a powder source, means to create a cloud of powder in gas, and means to convey the cloud to a plate carrying an electrostatic image for deposition thereon. Such devices, which include one or a number of the above elements and which are used to take powder from a source, whether it be a mound of powder or whether it be in other shapes or forms, and convert it to an aerosol of powder particles, is herein and generally in the art referred to as a "powder cloud generator" or as a "cloud generator."

It is an object of this invention to improve the art of xerography by improving powder cloud generators.

It is another object of this invention to provide new means and methods for creating aerosols of powder particles.

An objective in the art of xerography, as in any art concerned with image reproductions, is that of uniformly developing high quality copy. Means of obtaining this objective in xerography while using powder cloud development is by presenting a cloud of uniform density to the image so that the powder particles will deposit evenly and densely on the image. Accordingly, an object of this invention is to improve the art of xerography by presenting dense, uniform clouds of developer particles to electrostatic images. In this invention, a surface is uniformly loaded with powder particles and a uniform output of powder particles in gas is delivered from the output tube. The surface used in this invention is one capable of loading uniformly. The output of the device of this invention is a uniform and constant output of powder particles in gas. Further, the device of this invention is able to operate over long periods of time.

It is, therefore, an object of this invention to improve upon powder cloud generators so that a uniform and dense dispersion of particles of powder in gas is created.

It is another object of this invention to improve upon means and methods of creating uniform and dense dispersions of particles of powder in gas.

The objectives of this invention are attained through the use of a roughened or grooved surface rotated or moved in a substantially horizontal plane. At one point on the surface is positioned raw or bulk developer powder particles. These particles are held in position by a retaining arm or meter blade which also acts to meter out a uniform amount of powder to the surface as it moves or rotates beneath the powder supply and retaining arm. The particular surface is one which loads uniformly due to grooves or the like in the surface, which fill as they pass beneath the powder supply. Positioned over the grooves or the like is an output pickup tube which, using the principle of aspiration, draws particles and air into the tube and carries them as a mixture out through an output tube, thereby creating at the output end of the output tube an aerosol of powder particles.

And it is, therefore, a further object of this invention to provide a new powder cloud generator in which powder is uniformly loaded to a surface and is aspirated from the surface and delivered in a flow of gas out the output tube.

It is yet a further object of this invention to provide new means and methods for generating a powder cloud in which powder is loaded onto a surface and is then aspirated from the surface to create a flow of powder particles in gas out the output tube.

For a better understanding of this invention, together with other further objects thereof, reference is now had to the following description taken in connection with the accompanying drawings, and the scope of the invention will be pointed out in the appended claims.

Figure 1:
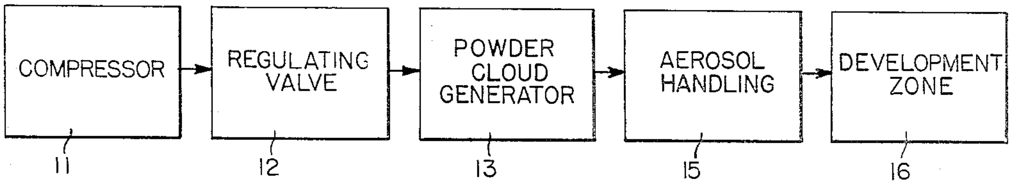
Figure 1 is a block diagram of elements which would generally appear in xerographic cloud creating apparatus for use in developing electrostatic latent images.

Referring now with more particularity to the drawings, in Figure 1 is shown a block diagram of elements which compose cloud creating apparatus for development of electrostatic images. As is indicated in this diagram, compressed air is fed from compressor 11 to a powder cloud generator 13 through a regulating valve 12, and the output of the powder cloud generator is fed through an aerosol handling block 15 and then to the development zone 16 whereat electrostatically charged developer particles are passed for development purposes to a surface carrying an electrostatic latent image.

The source of compressed or pressurized gas may be any suitable source, such as for example, an air pump or like pressure generating member or a suitable pressurized gas container. Such containers are readily available on the commercial market in the form of gas capsules of carbon dioxide or the like under pressure, in the form of bombs or the like of gas such as fluoro-chloroalkanes, which are available under the general family name of Freon. Similarly, a suitable system may comprise a pump or generating means optionally in combination with a pressure chamber whereby fluctuations in pressure may be limited or avoided.

Regulating valve 12 is used to control the rate of flow of gas from compressor 11 to powder cloud generator 13 and also to control the pressure of gas supplied to the powder cloud generator. The powder cloud generator, which is the next block in this diagram following regulating valve 12, is used to create an aerosol of powder particles. It may be supplied with powder in what may be termed the raw or bulk form, that is powder taken directly from a container and directly supplied in that form without treatment to a powder cloud generator, or it may be supplied with powder which is first treated and then placed in position in the generator. The particular powder used is dependent on a number of factors such as other elements used in the cloud creating apparatus, the form of xerographic development, the desired quality of final copy, and the like. A more detailed discussion of powders will appear below.

The aerosol handling block 15 of the diagram appearing in Figure 1 may represent any number of means and apparatus for imparting an electrostatic charge to the individual powder particles in the aerosol supplied from the powder cloud generator or it may represent any number of means and apparatus for deagglomerating particles fed in the aerosol from the generator. Charging and deagglomeration of particles may be accomplished by turbulently flowing them through fine capillary tubes. Charging may also be accomplished by passing the aerosol of powder particles through a corona discharge zone, or the like.

The aerosol is next supplied, as indicated by the block diagram, to development zone 16. Generally, this zone includes a means for expanding the aerosol to a cloud, and optionally this may be done by leading the air from tubes or the like to a larger area where the aerosol expands, creating the cloud of developer particles in gas. It is also feasible and sometimes desirable to use the particles in aerosol form without expension to create a cloud.

In xerography in order to develop a true copy of the original image, it is generally desirable to develop by depositing particles in opposition to gravitational pull in that the electrostatic charges on the image bearing surface truly represent the pattern of the image projected to the plate surface, and allowing gravitational forces to operate in the deposition of powder particles may result in a distorted reproduction. Also, the deposition of heavy and thus generally large particles or agglomerates of particles is substantially prevented when deposition of particles on the electrostatic image is carried out in opposition to the pull of gravity. One way of avoiding distorting effects of such forces in the reproduction produced is through the positioning of the plate so that deposition of particles is primarily caused by electrostatic charges on the plate surface. This may be accomplished by positioning the plate with the image bearing surface facing downward and creating a cloud beneath it. In some instances particles deposited because of other forces are removed during the development process through the use of such techniques as directing slight air currents or winds to the plate surface. Such winds or currents should be sufficient to remove particles not held in place due to electrostatic forces, but should be limited so that particles electrostatically held in place are not affected.

It is to be understood that many modifications may be made in the apparatus described in connection with the block diagram shown in Figure 1. For example, a device may be inserted between the powder cloud generator and the aerosol treating block for purposes of further deagglomerating clumps of particles fed in the aerosol fed from the powder cloud generator. A device may also be inserted between the powder cloud generator and the aerosol treating block for purposes of dehumidifying the developer powder particles. Such a device may also be inserted between the aerosol treating block and the development zone block. These modifications have been included herein for purposes of demonstrating that the powder cloud creating device shown and described in connection with Figure 1 is for illustrative purposes and is intended to include within its scope modifications and equivalents able to accomplish the purpose of generating a powder cloud for deposition on electric charge patterns.

It is also to be understood that the elements shown in Figure 1 to create the aerosol of powder in gas, that is, the elements omitting at least the development zone block and possibly the aerosol treating block, may be used for purposes other than development. As for example, the aerosol may be fed to a belt loader or belt impregnator wherein a tape or belt of material is passed over an opening fed by the aerosol thereby loading powder particles into the belt. The belt may then be used for the development of electrostatic images and the like by blowing the particles from the belt to a surface carrying an electrostatic charge pattern.

Figures 2, 4:
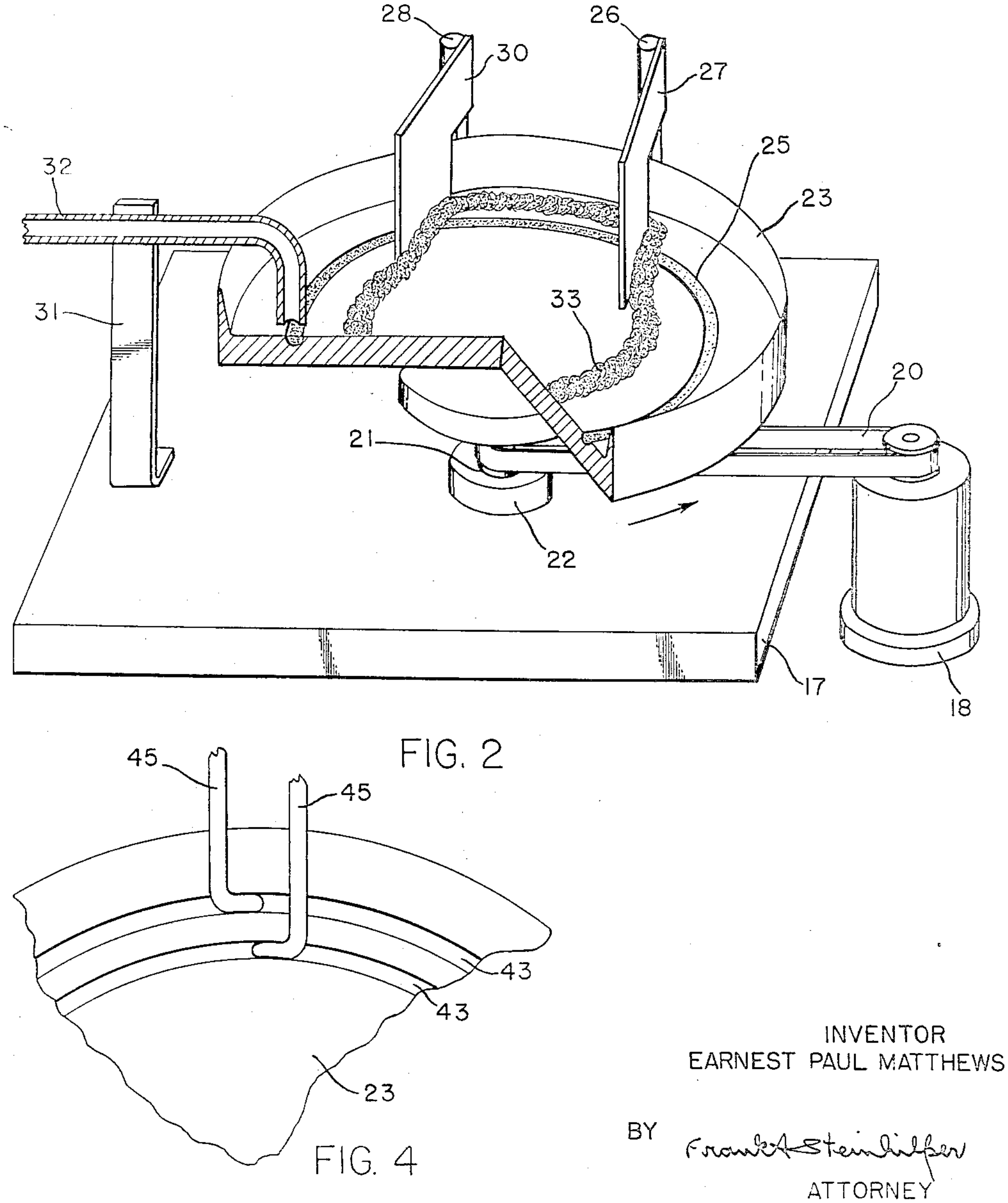
Figure 2 shows an oblique projection with a cutaway section of one embodiment of a powder cloud generator contemplated by this invention.
Figure 4 is a sectional top view showing another embodiment of a disc and also another embodiment of the aspirator pickup tube which may be used with this disc.

Reference is now had to Figure 2 wherein is shown a view of an embodiment of a powder cloud generator according to this invention. Elements of the generator are supported on a table 17 and are driven by a motor 18. Motor 18 is connected to axle 21 through an endless belt 20 and axle 21 is positioned in a ball bearing support 22. Ball bearing support 22 supports and allows movement of disc 23 through axle 21. Formed into disc 23 is a groove 25. Support rod 26 is affixed to and extends from table 17 and holds in position scraper blade 27. A similar rod 28 is connected to table 17 and holds in position scraper blade 30. Bar 31 connected to table 17 supports and holds in position pickup tube 32. A supply of developer powder designated 33 is positioned on and moves along the upper surface of disc 23.

Disc 23 in this embodiment is rotated around its center when motor 18 is operated. The disc is moved in a counter clockwise direction in this figure and scraper blade 27, which is positioned in the path of movement of developer supply 33 following passage by developer supply 33 of blade 30, acts to change the direction of developer supply 33 and to load groove 25. Developer supply 33, which is directed to an edge of disc 23 following passage of scraper blade 27, is redirected over groove 25 by scraper blade 30. Both scraper blades 27 and 30 are positioned to contact the upper surface of disc 23. In this embodiment, the upper surface of disc 23 is desirably flat, having a groove cut or formed therein. Thus the scrapers cause powder particles to move into the groove and also to follow the path as illustrated in this figure. Scraper blades 27 and 30 are positioned against the surface of disc 23 at an angle to the radii of disc 23.

These angles readily cause movement of the developer supply along a path as illustrated in this figure. A space exists between the raised edge or the wall of disc 23 and scraper blade 27, allowing passage of the developer particles or developer supply near the wall where the particles are directed because of the angle and position of scraper blade 27. Scraper blade 30, on the other hand, is positioned close to the wall or edge of disc 23 and is at an angle to direct the powder particles towards the center of disc 23. Scraper blade 27 extends far enough outward to the center to extend into the path of movement of developer supply 33. Through the action of both scraper blades 27 and 30, particles are loaded into the groove 25 and are directed along the path of movement as illustrated. Particles are prevented from moving on the flat surface of disc 23 near groove 25 because of the contact of scraper blades 27 and 30 with the flat surface of disc 23 and because of their angular positioning causing movement of the supply away from the area of groove 25. The path of movement of developer powder supply 33 is directed over groove 25 twice, once by scraper blade 27 and the second time by scraper blade 30, to assure uniform and full loading of groove 25. Contact by blades 27 and 30 with the flat upper surface of disc 23 is to further assure uniform loading by preventing more particles than a level measure per area of groove from passing to the output area.

To assure that particles remain in place and move along predetermined paths during rotation of the disc, it is desirable to maintain the upper surface of the disc in substantially a horizontal plane. However, it is to be realized that it is intended to include within this invention angular positioning of the disc as long as particles move along a path which results in uniform loading and as long as particles loaded to the groove remain in position until carried to the output area. Particles and air are aspirated into pickup tube 32 and are delivered through an output tube for use in desired areas. The principle of operation of aspirating the particles from groove 25 will be discussed hereinafter in connection with Figure 5 in this case. Once the particles are removed into pickup tube 32, a clean groove is passed for further loading by scraper blades 27 and 30.

It is to be understood, of course, that many modifications may be made in the powder cloud generator shown in Figure 2. A number of these modifications will be shown and discussed in the material that follows. The embodiment shown in Figure 2 is to illustrate the operation of a powder cloud generator according to this invention and modifications through the substitution of equivalents and the like which act to accomplish the purpose of loading a surface uniformly with particles and carrying these loaded particles to an output or pickup area where they are created into an aerosol of powder particles are intended to be encompassed within this invention.

Figure 3:
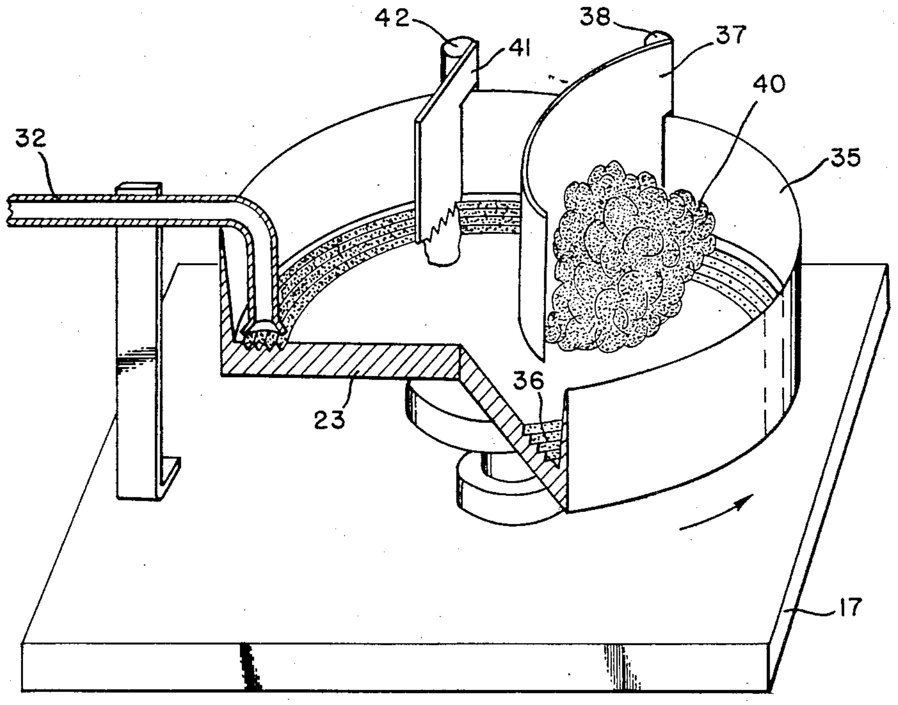
Figure 3 shows an oblique projection with a cutaway section of another embodiment of a powder cloud generator contemplated by this invention.

Reference is now had to Figure 3 wherein another embodiment of a powder cloud generator according to this invention is shown. As in the case of Figure 2, the table is herein designated 17, the pickup tube 32, and the disc 23. The wall or edge of disc 23 herein designated 35 is preferably higher than the wall or edge shown in connection with Figure 2. A number of grooves 36, in this instance four, have been formed into the flat surface of disc 23, but it is to be understood, of course, that a greater or lesser number of grooves could be present. A support rod 38 mounted on table 17 positions a retaining arm 37. The retaining arm 37 preferably makes close contact with the edge 35 of the flat surface of disc 23 and, in fact, it is desirable that the edge of the arm making close contact act in effect as a seal against edge 35. A supply of powder particles 40 is positioned on the flat upper surface of disc 23 which, as in the case of the embodiment shown and discussed in connection with Figure 2, is desirably held substantially in a horizontal plane. The supply is held in place by gravity holding the particles against the disc surface and by retaining arm 37, due to the movement of disc 23 in this embodiment in a clockwise direction. Preferably, retaining arm 37 extends at least from the center of disc 23 to the edge or wall 35 and desirably retaining arm 37 is curved in shape so that the greater portion and leading portion of powder supply 40 is constantly directed over grooves 36 to assure uniform, full and constant loading of the grooves. Retaining arm 37 acts also to prevent excess powder from moving on the flat surface of disc 23 as it passes by retaining arm 37 due to the seal-like contact of retaining arm 37 with the flat upper surface of disc 23, thereby assuring uniform loading of grooves 36. It is to be understood, of course, that the retaining arm may be formed so that a layer of particles would be loaded above the flat surface over the grooved area. As a further measure to assure a uniform amount of particles loaded to each area of the disc, it is desirable to take caution in forming the grooves to assure an equal volume to be loaded throughout in grooves 36.

Support rod 42 which is fixedly mounted on table 17 supports and holds in position prong blade 41. Prong blade 41 has at its lower edge a number of prongs, each of which extends into one of the grooves of grooves 36. The prongs act to stir up and to free the powder particles loaded into grooves 36 to assure a uniform and constant output and to prevent caking of developer powder particles in grooves 36. It is to be realized that if powder particles cake and thereby clog portions of grooves 36, the amount of fresh powder particles loaded from supply 40 into grooves 36 as they pass beneath powder supply 40 and scraper blade 37 will vary, depending upon the unfilled volume of grooves 36. Varying amounts of powder loaded into the grooves will result in varying outputs and the scraping of grooves 36 with prong blade 41 prevents caking and frees particles for removal in pickup tube 32, thereby assuring clean grooves for uniform loading and uniformly loaded grooves for uniform outputs.

The drive mechanism for this powder cloud generator may be similar to the drive mechanism shown in Figure 2, or may be any type of mechanism known to those skilled in the art to cause rotation of disc 23.

The removal of particles from disc 23 by pickup tube 32 is similar in action and operation to that of removal of particles by pickup tube 32 in Figure 2. Particle removal and aerosol creation will be discussed hereinafter.

Reference is now had to Figure 4, wherein is shown, in section, another embodiment of a disc contemplated by this invention and an embodiment of an output system contemplated by this invention. In this embodiment, as in the embodiment discussed in connection with Figures 2 and 3, the disc is designated 23 and in this embodiment disc 23 is provided with two grooves, both designated 43, which are spaced apart and separated by the flat upper surface of disc 23. Over each groove is a pickup tube, each designated 45, each acting to remove in a flow of air the developer powder particles transported beneath them within grooves 43. The processes of loading the grooves and stirring up particles in the grooves may be similar to those shown and described in connection with Figures 2 and 3, or other similar means may be used to accomplish the same purposes. It is to be understood, also, that although only two grooves and two output pickup tubes are shown in this figure, it is feasible to have three, four, five, six or more grooves and output pickup tubes. When the grooves become numerous and closely spaced, it is sometimes desirable to separate or narrow the aspirating effect of the pickup tubes by providing a break wall or the like between the grooves on disc 23, thereby creating an output for each pickup tube 45 of only developer particles appearing in the groove beneath the pickup tube. The output, of course, of the pickup tubes 45 may be fed separately to different areas and used in different ways or similar ways, or their outputs may be combined and used in any one of a number of applications that this form of disc generator may be put to.

Figure 5:
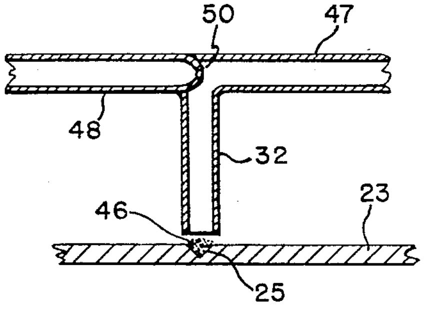
Figure 5 is one embodiment in cross section of aspirating apparatus that may be used with this invention.

Reference is now had to Figure 5 wherein is shown in section an embodiment of an aspirator type of pickup and output tube. The disc in this embodiment is again designated 23, the pickup tube 32, and the groove is designated 25, as in the embodiment described in connection with Figure 2. In this figure, powder particles 46 are shown loaded into and slightly above groove 25. For such loading, a scraper blade having a raised or cutaway area over the groove is positioned to otherwise contact the flat surface of disc 23 and powder particles pass beneath the scraper blade filling the groove and also in a layer above the groove. Particles, in loading, naturally load into the groove, and the particles are such that they tend to draw additional particles with them. The scraper blades allows a predetermined uniform load of powder particles to pass and prevents an excess of particles from traveling with or on disc 23. Blades allowing the formation of a layer on top of the grooved area may be formed having an adjustable section over the grooved area to thereby control the thickness of the layer allowed to deposit through the adjustment of this section.

Pickup tube 32 feeds as is shown in this figure to output tube 47. Tube 48 is connected to tubes 32 and 47 and is provided with a flow of compressed air, as for example from compressor 11 of Figure 1. Tube 48 ends in a nozzle or jet 50 positioned to end centrally over pickup tube 32. The compressed air fed to tube 48 is further compressed to pass through nozzle or jet 50. Its path on leaving nozzle or jet 50 is through output tube 47. Jet 50 tends to increase the speed of flow of compressed air leaving the jet and the compressed air expands to fill the larger area next in its path of movement following movement through the jet, thereby creating a partial vacuum in tube 32. The partial vacuum in tube 32 sucks up or aspirates both air and the particles positioned in the groove beneath the open end of tube 32. The particles and air aspirated into tube 32 move to the area of jet 50 and are carried and mixed with the stream of air fed from jet 50 through output tube 47. As is shown in this figure, it is desirable to space pickup tube 32 at a slight distance above the layer of powder particles 46 in groove 25. Contact with the powder allows the powder to act as a barrier to the free movement of air and particles into pickup tube 32. Too large a distance between the opening in tube 32 and the layer of powder particles 46 creates too thin a mixture of developer particles in air aspirated into pickup tube 32 and may cause inefficient removal of particles 46 from groove 25. Optimum spacing is attained when the opening is as close to the powder as is possible without touching or contacting the powder particles. It is to be understood, of course, that although a specific embodiment of a type of aspirator has been described in connection with this figure, this invention is intended to include other forms of aspirators able to aspirate particles from a groove and mix the particles to create an output of powder in gas similar to the output created by output tube 47 shown in this figure. It is also to be understood that although operation of this aspirator has been described in terms of air, it is operable with different forms of gas which may be conveniently supplied in compressed form to tube 48.

A beneficial effect presently believed to result from the use of the jet type of aspirator shown in this figure relates to the expansion of compressed gas as it leaves jet 50. At that point, a mixture of powder in air is supplied from pickup tube 32 and the expansion of the compressed gas, it is presently believed, causes a local turbulence in the output tube resulting in deagglomeration of particles and also a uniform dispersion of particles in the aerosol created.

Figure 6:
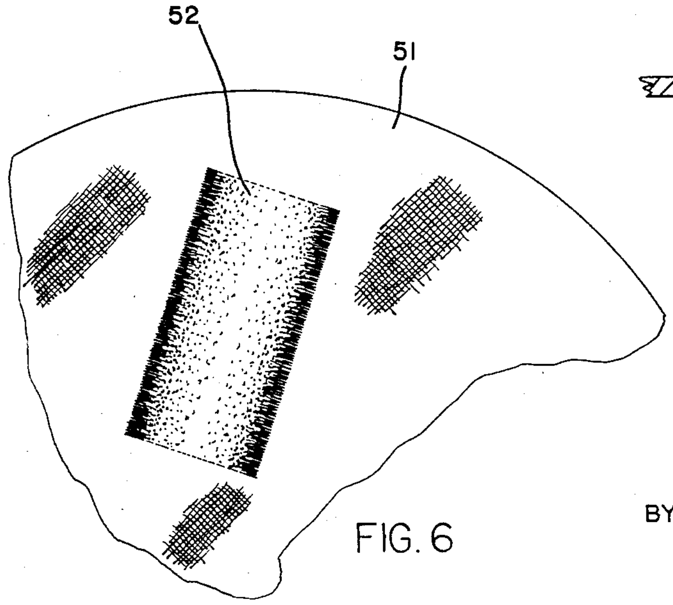
Figure 6 is a sectional top view showing another embodiment of a disc and an embodiment of means to assure a uniform output of particles in the output aerosol.

Reference is now had to Figure 6 wherein is shown in section another embodiment of a disc and another technique to assure a uniform output of powder particles in gas. In this figure a disc designated 51 is formed of a solid material having a uniformly rough surface. Such a disc may be formed by molding a plastic disc against a wire screen and removing the wire screen once the disc material has hardened. Another means of forming the disc is simply by using the uniform checker board rough pattern on the back side of masonite or like material. Sand blasting metal would also be a method of forming a roughened disc as long as provisions are taken to provide for uniform roughness along the top surface. Uniformity in roughness is desired so that uniformity in loading results, thereby constantly supplying during operation a uniform supply of powder particles beneath the pickup tube. Any means for accomplishing uniform roughness or any disc having a uniformly rough top surface is intended to be encompassed within this invention.

Positioned on disc 51 shown in Figure 6 is a brush 52 for purposes of stirring up the powder particles positioned on the disc surface. The brush desirably is positioned to contact and to bring a slight amount of pressure to bear against the top surface of disc 51. Rotation of the brush may be caused by the rotation of disc 51 or by a separate drive means, and agitation of the particles imbedded in the indented areas of disc 51 will be accomplished by the brushing against and flicking away of brush 52 on the top surface of disc 51. It is desirable to position brush 52 against the surface of disc 51 at a point along the direction of movement of disc 51 following loading or prior to the aspirating off of the loaded powder particles. In this way brush 52 acts to agitate and free the particles so that all in the path of movement beneath pickup tube 32 will be removed. When all are removed the surface of the disc will continuously accept a uniform load thereby providing a constant and uniform output of an aerosol of powder particles. It is to be understood that although in this figure a brush 52 is shown, this invention is not intended to be limited thereby, but is intended to include within its scope other means known to the art for agitating and stirring up powder particles loaded to a surface without removing them therefrom. The particular brush shown in this figure is shown with its axis at an angle to the radii of disc 51. This has been done to further assure a stirring up action, but it is to be realized that other positions would accomplish the same objective and are intended to be encompassed by this invention.

It is also possible to position the brush at a point after removal by the pickup tube of the powder particles on the surface. Such a brush will act to cleanse and loosen particles from the surface to thereby assure uniform loading of particles. The brush, it is to be realized, acts similar to the pronged scraper blade, and, in fact, a brush type of stirring member could be included in the groove disc type of generator shown in Figures 2, 3, 4 and 5.

The brush is preferably made up of bristles having the quality of tending to flick when coming out of contact with the disc surface to thereby aid in the stirring up motion of the particles on the disc surface. Nylon brush bristles have been found to work very well in accomplishing this purpose. It is to be realized that any slightly stiff to stiff bristles brush will work well and is, therefore, intended to be encompassed by this invention.

The disc in each instance described is driven by a motor. Preferably the motor is of the variable speed variety, thereby allowing control over the turning speed of the disc. It is desirable to use a variable speed motor able to rotate the disc up to 40 revolutions per minute, although the disc generally will be used rotating at less than 10 revolutions per minute. The speed resulting in optimum operation is at approximately 4 revolutions per minute.

The groove shown in Figure 2 wherein a single groove disc is illustrated, is about ⅛ of an inch deep and about 3⁄16 of an inch wide. Using multiple grooves, such as shown in Figure 3, grooves having a depth and a width of about 1⁄32 of an inch are used. It is to be realized that the depth and width of the grooves may vary substantially. A particular output is possible using discs with different groove sizes. For example, the same denseness of particles in gas may be produced using a disc with narrow and shallow grooves as may be produced using a disc of wide and deep grooves. To accomplish this output a greater number of revolutions per minute for the disc, a greater overlayer of particles over the grooves, or the like, may be necessary for the disc having narrow and shallow grooves as these elements relate to the disc having wide and deep grooves. The desire in each instance is to provide an area which may be uniformly loaded with powder particles and to create, using the loaded powder, an aerosol of powder particles which is valuable in the art of xerography.

The pickup tube may take various shapes and forms, as for example, it may be round, square, or the like. A wide latitude also exists as to the shapes and forms of the opening of the pickup tube. It may have a large opening, as for example a funnel-shaped, wide mouthed opening, or it may just be an extension of the tube itself. Generally it has been found using pickup tubes of from ⅛ to ¼ inch tubing produces optimum results, the particular size tubing depending on a number of factors. When too large a tube is used, the velocity of the aerosol is slow through the tube and if the tube is much too wide, powder may not be picked up from the disc beneath the tube. On the other hand, when a narrow tube is used, a point is reached where the velocity of the aerosol will not increase further in that the point of complete effectiveness of the partial vacuum has been reached and passed, and clogging of the tube with powder particles may result.

The disc or surface in which the groove is formed may be any material into which a groove or rough surface may be formed, as for example, plastics, metals, fibrous compositions, glass and the like.

As has been pointed out previously, the scraper blades may be used to prevent a powder layer from forming over the disc surface or it may be used to form a layer over the grooved area of the disc. In the case of the roughened disc as shown in Figure 6, either a flat layer into the indented areas may be loaded to the disc surface or a scraper blade having a raised portion therein may be used and a layer may be positioned to extend over the disc surface in that area of the disc which will pass beneath the pickup tube. Whether or not a layer is placed above the surface of the disc is dependent on a number of factors, such as the depth of the grooves, the output aerosol of powder particles desired, the rotation speed of the disc, and the like. Using a particular disc at a particular rotation speed, it is possible to obtain more output through the use of a layer of powder particles on the surface than in the instance when the groove is loaded level with the surface. It is thus seen that the different elements of powder cloud generators according to this invention are very much interrelated and the determination of specific elements to be used such as the specific disc having a specific groove or roughened surface, the particular scraper blade and the like, determine other elements or factors in the operation of the powder cloud generators to produce a desired aerosol of powder particles.

Another factor which may vary depending on the other elements used such as the rotation speed, the particular use desired, and the like, is the aspirator element illustrated in Figure 5. Generally it may be said that using a 0.25 inch tube feeding to a jet or nozzle having a hole of 0.028 inch in diameter, air flows ranging from 0.56 to 1.37 cubic feet per minute with pressures ranging from 20 to 100 p.s.i.g. will work well to produce a valuable output of an aerosol of powder particles from the output tube of the generator shown and discussed in this invention.

An aerosol which is considered valuable in xerography is made up of 0.1 gram of powder particles per liter of gas. Such an aerosol fed at the rate of 0.81 cubic foot per minute can develop a 4″ x 5″ xerographic plate in from two to five seconds. It is to be realized that the figures given herein are for illustrative purposes. Denser aerosols may be used and the plate will develop faster. Thinner aerosols may be used and development time will be longer. Also, aerosols used for other purposes, as for example belt loading or impregnation, may be quite dense or quite thin in that belts may be loaded at a slow or fast rate or may be loaded once or a number of times, or may be loaded lightly or heavily, or the like. In each instance, the use of the aerosol must be determined, and great latitude exists as to the mixtures of particles in gas which are possible and are intended to be encompassed herein. The desire in each instance is for a constant output having a uniform dispersion of particles in the aerosol.

Although this invention has been discussed and described in terms of a roughened disc or a grooved disc, it is to be realized that the surface to be loaded may take other shapes and forms. As for example, it is possible to form the surface out of an endless plastic belt or the like having a uniformly roughened pattern throughout or having a groove formed therein. The belt may be then positioned over two wheels and caused to move while a retaining arm or scraper blade or the like is positioned to contact the roughened or grooved surface and to load therein powder developer particles. A brush, prong blade, or like member may also be positioned to contact the surface to agitate or stir up and prevent caking of particles on the surface of the belt and a pickup tube should be positioned so that the particles may be aspirated from the surface to thereby create the aerosol of powder particles as the output of the powder cloud generator.

It is pointed out that in order to maintain particles in their proper position on the surface whether being loaded, whether loaded, or whether at point of aspiration, it is desirable to maintain the surface while being loaded and while loaded in substantially a horizontal plane. Particles on the surface are then kept in place because of gravitational forces. It is to be realized, however, that positioning the surface at an angle to the horizontal is also intended to be encompassed herein, as long as the particles tend to remain in position.

It is to be realized also that although this invention has been described in terms of one supply of particles for loading and one pickup tube, it is intended to include within this invention more than one supply of particles along the area of rotation of the disc followed by a pickup tube in each instance. Pickup tubes may feed individually or separately to different areas, or their outputs may be combined to provide one heavy or dense aerosol of powder particles.

The amount of developer particles placed behind the retaining arm or scraper blade is dependent on the amount of continuous use without reloading desired of the powder cloud generator and also the shape and size of the scraper blade, which determines how much powder a blade will retain. It is to be realized, of course, that the powder cloud generators described herein need not be enclosed in any form of housing, and therefore, additional powder may be added at any time during operation without in any way disrupting the output of the aerosol of powder particles.

From the point of view of composition of the developer particles, prints or pictures may be produced with charcoal, carbon blocks, or carbonaceous pigments. Under proper conditions, any of a number of various carbon or lamp black materials may be employed, including such material as furnace blacks, channel blacks and the like. In addition, there may be used such material as milled charcoals and similar materials, or, if desired, finely divided materials having added pigment matter. In the latter category are materials such as finely divided resins containing pigments or dyes such as carbonaceous pigments or various coloring pigments and the like, compositions of this type being preferred where the print or picture ultimately is to be made permanent by a fusing process including heat or vapor fusing. When the end image is not made permanent by a fusing process, milled wood charcoal is preferred.

Although this invention has been described in terms of a moving surface or disc beneath a stationary powder supply held in place by a retaining arm or scraper blade and a moving surface or disc moving under a stationary output tube, it is to be realized that an aerosol of powder in gas similar in all respects may also be created through the movement of the retaining arm or scraper blade and the powder supply with it and also the movement of the pickup tube while holding the disc or other surface stationary. The need and desire is relative movement rather than movement of any particular elements.

The uses the powder cloud generators of this invention may be put to include but are in no way limited to the development of electrostatic latent images and belt loading or impregnation. The velocities and pressures of aerosols created in the output end of powder cloud generators according to this invention generally are in the preferred range of aerosol movement for belt loading or impregnation or for line copy development, and for this reason the cloud generators described in this invention have particular value for such applications. In belt loading, particles are carried to a belt of material and blown into the belt. The belt may then be used by blowing the particles impregnated therein out of the belt for development of electrostatic images. Belts have their value as storage areas of developer particles for the development of electrophotographic images and also supply additional beneficial features which aid in the production of uniform and dense clouds. It is to be understood, of course, that other valuable uses exist for powder cloud generators as described herein, and such uses are intended to be encompassed by this invention.

While the present invention as to its objects and advantages, as has been described herein, has been carried out in specific embodiments thereof, it is not desired to be limited thereby, but is intended to cover the invention broadly within the spirit and scope of the appended claims.

What is claimed is:

1. A generator of an aerosol of powder particles comprising a disc-shaped surface having a circular uniform groove concentrically positioned within said surface, guide and support means to maintain said surface facing upward while substantially in a horizontal plane with said groove extending downward and from said plane, means to rotate said surface around its central area, meter means positioned extending above said surface adapted to meter a uniform amount of powder particles to said grooved area of said surface and adapted to hold in position against said meter means as said surface moves relative to said meter means a supply of powder particles, agitating means positioned to ride into said groove adapted to agitate powder particles therein following passage of an area of the groove beneath said meter means, said agitating means being next in the path of movement of said surface following movement beneath said meter means, and an aspirator having its pickup end positioned at a slight distance above said surface over said grooved area next in the path of movement of said surface following movement beneath said agitating means, said aspirator being adapted to suck particles out of said groove and supply an aerosol of powder particles out its output end.

2. A generator of an aerosol of powder particles comprising a flat disc-shaped surface having uniform circular grooves concentrically positioned within said surface, said surface being positioned substantially in a horizontal plane facing upward with the grooves extending downward from the horizontal plane, a scraper blade extending upward from said surface while in contact with the flat portions of said surface adapted to retain on said surface against said blade a supply of powder particles and adapted to release particles to said grooves to thereby load the grooves, an aspirator having its pickup end positioned above said grooves in said surface and at a slight distance therefrom, agitating means positioned to ride into said grooves adapted to agitate powder particles loaded therein, and means to bring about relative movement between said surface and said scraper blade and relative movement between said surface and said agitating means and relative movement between said surface and said pickup end of said aspirator, said movement causing areas of said grooves in said surface to first pass beneath said scraper blade and then beneath said agitating means and then beneath said pickup end of said aspirator.

3. A generator of an aerosol of powder particles for use in developing xerographic images comprising a flat disc having a circular uniform groove 3/16 of an inch wide and 1/8 of an inch deep concentrically positioned within said surface, said grooved surface of said disc being positioned substantially in a horizontal plane facing upward with said groove extending downward from said plane, a wall adjoined to and extending upward from all areas of the edge of said disc, a scraper blade having an adjustable slide therein, said scraper blade being positioned to extend upward from said disc while in contact with the flat portions of said surface with said slide positioned over said groove in said surface, said blade being positioned to extend at least from the center of said disc outward to the wall extending upward from the edge of said disc, an aspirator having a 1/8 inch tubing pickup tube positioned over said groove in said disc surface at a slight distance above the flat surface of said disc surface, a prong positioned to ride in said groove on said disc surface, and a motor connected to said disc to cause rotation around its center, said scraper blade being adapted to hold in position a supply of developer powder particles on said disc-shaped surface against said blade as said surface rotates, said slide in said blade being adjustably positionable to meter a uniform amount of particulate material to said grooved area of said disc surface as said disc rotates therebeneath, said prong being adapted and positioned to agitate powder particles loaded to said groove of said disc surface and said pickup tube of said aspirator being positioned and adapted to remove particles once agitated from said grooved disc surface in an air flow, the elements positioned above the disc being disposed in relation to one another as the disc rotates therebeneath to cause an area of the disc to pass first beneath said scraper blade then beneath said prong then beneath said pickup tube.

4. A generator of an aerosol of powder particles comprising a flat disc having a loading zone comprising a depressed region at least in an annular area concentric with said disc and extending into said disc from one surface thereof, said loading zone being of substantially uniform cross section, said disc being positioned and disposed with the surface thereof including said loading zone facing upward while substantially in a horizontal plane, means to rotate said disc around its center, meter means positioned extending above said upward facing surface of said disc and adapted to meter a uniform amount of powder particles to said loading zone as said disc moves relative to and beneath said meter means, and an aspirator having its pickup end positioned at a slight distance above said upward facing surface and over said loading zone next in the path of movement of said disc following movement beneath said meter means, said aspirator being adapted to suck particles out of said loading zone as said zone moves beneath said pickup end and supply an aerosol of powder particles out its output end.

5. A generator of an aerosol of powder particles in accordance with claim 4 including agitating means positioned above said disc and positioned to ride into said loading zone following passage of said disc beneath said meter means to loosen particles loaded into said depressed region prior to movement of said disc beneath said aspirator pickup end.

6. A generator of an aerosol of powder particles in accordance with claim 4 in which said loading zone comprises at least a uniform circular groove in said disc and in which said meter means comprises a first and second rigid scraper blade, each of said blades being positioned to contact the upper surface of said disc and each of said blades being positioned at an angle to the radii of said disc to redirect a supply of powder particles on the surface of said disc over said depression in said disc surface after the particles have moved by said other scraper blade as said disc rotates and each of said blades extending into the path of movement of powder particles on the surface of said disc as said disc rotates after passage of the particles past the other of said blades.

References Cited in the file of this patent

UNITED STATES PATENTS

| | | |
|---|---|---|
| 906,176 | Westbrook | Dec. 8, 1908 |
| 1,283,071 | Copper | Oct. 29, 1918 |
| 1,319,377 | Copper | Oct. 21, 1919 |
| 2,416,695 | Jessop et al. | Mar. 4, 1947 |
| 2,614,655 | Katz | Oct. 21, 1952 |
| 2,664,226 | Gobin | Dec. 29, 1953 |
| 2,684,902 | Mayo et al. | July 27, 1954 |
| 2,701,764 | Carlson | Feb. 8, 1955 |
| 2,716,826 | Huebner | Sept. 6, 1955 |
| 2,718,987 | Kimball | Sept. 27, 1955 |
| 2,725,304 | Landrigan et al. | Nov. 29, 1955 |
| 2,756,676 | Steinhilper | July 31, 1956 |